Dec. 1, 1970      B. F. MILLER      3,544,178

COUPLING ASSEMBLY

Filed June 27, 1968      2 Sheets-Sheet 1

INVENTOR
BERNARD F. MILLER
BY
*Frank H. Thomson*
ATTORNEY

United States Patent Office 3,544,178
Patented Dec. 1, 1970

3,544,178
COUPLING ASSEMBLY
Bernard F. Miller, Corning, N.Y., assignor to Ingersoll-Rand Company, New York, N.Y., a corporation of New Jersey
Filed June 27, 1968, Ser. No. 740,733
Int. Cl. F16c 33/34
U.S. Cl. 308—78      11 Claims

ABSTRACT OF THE DISCLOSURE

A journal and bearing type coupling assembly for connecting a reciprocating member such as a piston or cross-head of a compressor to an oscillating member such as a connecting rod. The piston is provided with a bore having a first bearing surface which is eccentric to and has a diameter smaller than a second bearing surface of the bore. A wrist pin connects the reciprocating member and oscillating member and includes a first portion which is eccentric to and of a smaller diameter than a second portion. As the connecting rod oscillates, the rod is alternately supported on the first and second bearing surfaces. This permits complete lubrication of the bearing.

BACKGROUND OF THE INVENTION

This invention relates to a coupling assembly and more particularly to a bearing and journal assembly used to connect a reciprocating member and an oscillating member such as the piston and connecting rod of an internal combustion engine or the cross-head and connecting rod of a compressor.

In high pressure machines such as reciprocating process compressors, lubrication of the bearings used in the coupling between the connecting rod and the cross-head has presented difficulties particularly when a non-reversing load is applied to the coupling. The contact point between the wrist pin and the bearings is difficult to lubricate. Lubrication of the entire bearing is essential if long life of the bearing is to be achieved.

Prior to this invention, structure such as that shown in U.S. Pat. No. 3,065,638, and British patent specification No. 723,759, has been provided which permits lubrication of the entire bearing even though it is subjected to a non-reversing load. Such apparatus includes an eccentric arrangement which provides two bearing surfaces. As the connecting rod oscillates, the piston is alternately supported on first one bearing surface and then on the second bearing surface. When the support is provided at one bearing, a clearance results at the other. Lubricant is fed into this clearance.

Although such prior arrangements are satisfactory for many applications, their use is generally limited to areas where the coupling is subjected to a non-reversing load from one direction. In order to provide a coupling which can be used in a high pressure reciprocating process compressor, it is necessary to provide a journal and bearing assembly which is capable of being subjected to both a reversing load and non-reversing loads in either direction.

SUMMARY

It is therefore the principal object of this invention to provide a novel coupling assembly which can be used on machines where a non-reversing load in either direction may be encountered.

It is a further object of this invention to provide a journal and bearing assembly which permits adequate lubrication of the bearings regardless of the direction in which the assembly is loaded.

It is a further object of this invention to provide a coupling assembly which is of simple construction yet provides adequate support for the members to be connected.

In general, the foregoing and other objects will be carried out by providing a coupling assembly for rotatably connecting first and second members comprising: a first member having a bore therein; a second member having a bore therein; one of said bores having first bearing and second bearing surfaces; said first bearing surface being eccentric to the second bearing surface and having a radius of curvature different from the radius of curvature of the second bearing surface; pin means extending into each of said bores and having first and second arcuate surface portions; said first arcuate surface portion being eccentric to said second arcuate surface portion and having a radius or curvature different from said second arcuate surface portion.

BRIEF DESCRIPTION OF THE DRAWINGS

The invention will be described in connection with the annexed drawings wherein.

DESCRIPTION OF THE PREFERRED EMBODIMENT

Figure 1:
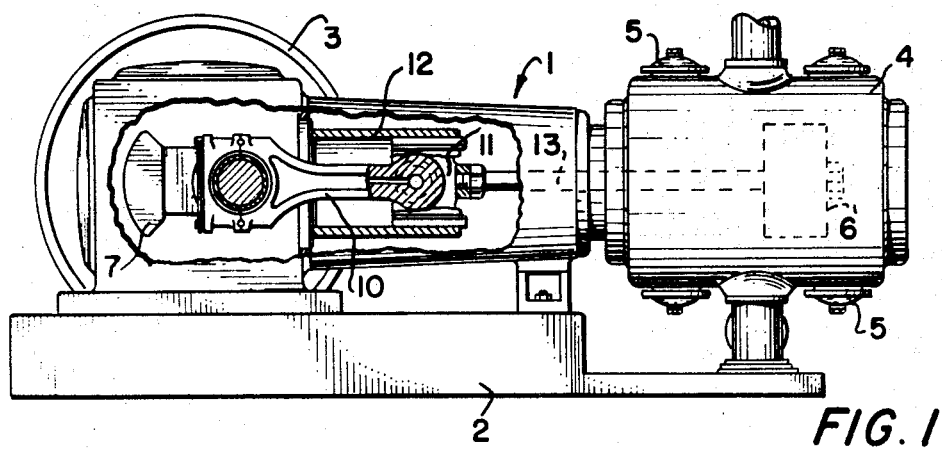
FIG. 1 is a plan view, with parts broken away and in section, of a compressor employing one embodiment of this invention.
Figure 2:
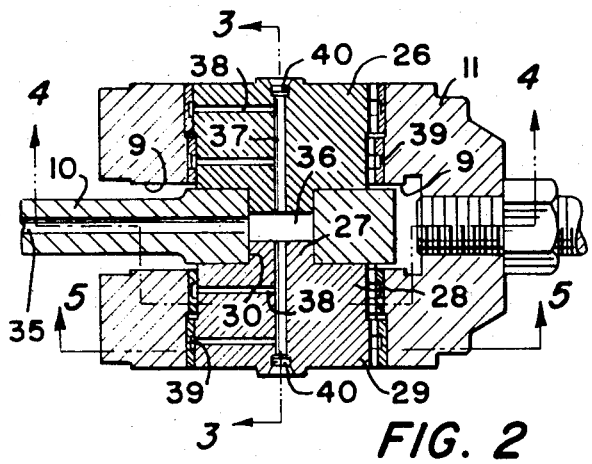
FIG. 2 is a sectional view of one embodiment of this invention used for coupling the cross-head of a reciprocating process compressor to a connecting rod.

Referring to FIG. 1, a reciprocating process compressor is generally indicated by the numeral 1. The compressor unit is supported on the base 2 and includes a drive means 3 of any suitable type. A compression end 4 of the compressor is separated from the drive means and includes inlet and exhaust valves generally indicated at 5. A piston 6 reciprocates in the cylinder for compressing fluid such as air. The engine means includes a crank 7. A connecting rod 10 is mounted on the crankshaft 7 and has secured to its other end a suitable cross-head 11, well known in the art, by a wrist pin and bearing arrangement which forms the subject matter of this invention. The cross-head reciprocates in a cross-head barrel 12. A piston rod 13 connects the piston 6 to the cross-head 11. A pair of guide shoes 14 support the cross-head in the cross-head barrel 12.

As the crankshaft 7 is rotated by the engine means 3, the cross-head 11 will reciprocate in the cross-head barrel 12. The reciprocation of the cross-head 11 is transferred to the piston rod 13 hence reciprocating the piston 6. As the crankshaft 7 is rotated and the cross-head 11 reciprocates, the connecting rod 10 will oscillate about the coupling between the cross-head 11 and the connecting rod 10 in the conventional manner. The operation of the compressor is conventional and need not be described in further detail.

The structure of the coupling of this invention is best shown by referring to FIGS. 2 to 5. The cross-head has an open portion 9 for receiving one end of the connecting rod 10 and a suitable bore 15 extending therethrough. On each side of the open portion 9, the bore has a first bearing portion with its longitudinal axis 19 on the centerlines 17 and 18. This portion of the bore receives a first or small bearing 16. The outer ends of the bore 15 are bored so that their longitudinal axes 22 are on the centerlines 17 and 21. This portion of the bore receives a large or second bearing 20. The second bearing portion is thus not only eccentric to the first bearing portion but also has a larger radius of curvature than the radius of curvature of the first bearing portion.

Figure 3:
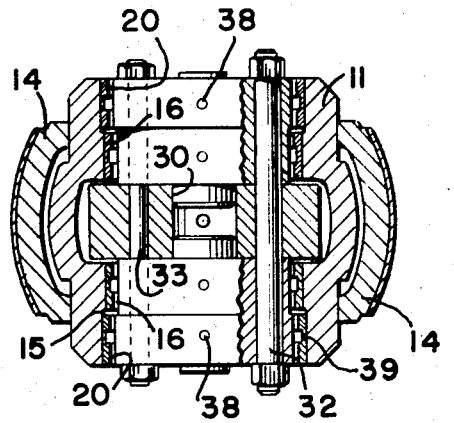
FIG. 3 is a sectional view taken on the line 3—3 of FIG. 2 looking in the directin of the arrows with a portion of the wrist pin shown in elevation for purposes of clarity.

A wrist pin 26 is adapted to be received by the bore 15 containing bearings 16 and 20 and by a bore 30 in the connecting rod 10. This pin is formed in two parts having a similar shape. Each half of the wrist pin includes a connecting rod portion 27 which is preferably ground so that its longitudinal axis is coaxial with the longitudinal axis of the first bearing portion 16. The wrist pin portion 27 is dimensioned to be received with an interference fit by the bore 30 in the connecting rod 10. Each half of the wrist pin 26 includes, in addition, to portion 27, a first or small pin portion 28 which is machined so that in the no-load condition, it is coaxial with the small bearing portion 16 but is necessarily smaller in diameter than the bearing 16 to provide adequate clearance. The wrist pin 26 is also provided with a second or large pin portion 29 which is machined so that in the no-load condition, it is coaxial with the second bearing 20 and is thus eccentric to the first wrist pin portion 28. The pin portion 29 has a diameter larger than the small pin portion 28 but is smaller in diameter than the large bearing 20. The two pin portions are secured to each other and to the connecting rod 10 by bolts 32 (FIG. 3). A fitted bolt 33, well known in the art, is also used in order to insure accurate alignment of parts.

In order to lubricate the bearings 16 and 20 and the wrist pin 26, a lubricant feeding means has been provided. The connecting rod 10 is provided with a lubricant passage 35. Each pin half has a longitudinal passage 37 closed at one end by a plug 40 and radical passages 38. Lubricant is supplied through passage 35 to a chamber 36 formed by the pin halves and the bore 30 in the connecting rod 10. The lubricating fluid flows through the longitudinal passages 37 to radial passages 38 which lead to spiral passages 39 in each of the bearings 16 and 20.

When the machine is loaded, there is relative movement between the bearings and the wrist pin so that the wrist pin contacts and is supported by the bearings. Due to the eccentric arrangement of the bearings and wrist pin, the wrist pin is continuously supported by the bearings, but lubrication is permitted. The coupling and its functioning will be described as though a load were applied from the frame end, i.e. the connecting rod 10 is in tension.

Figures 4, 5:
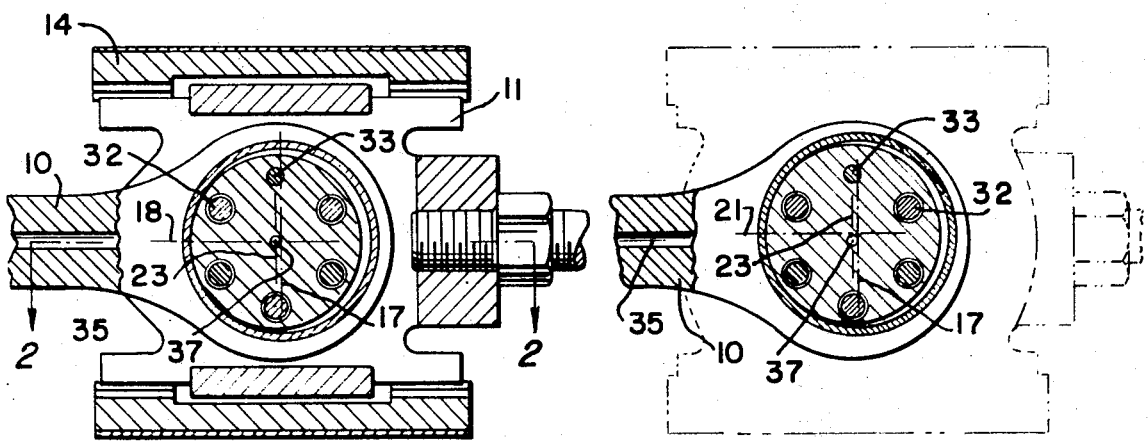
FIG. 4 is a sectional view of the coupling of this invention taken on the line 4—4 of FIG. 2.
FIG. 5 is a view similar to FIG. 4 but taken on the line 5—5 of FIG. 2.
Figure 6:
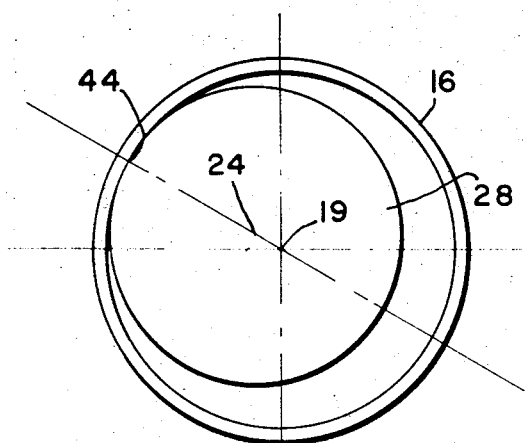
FIG. 6 is a schematic view of one of the wrist pin and bearing portions with the connecting rod swung above the centerline of the cross-head and a load applied from the right.
Figure 7:
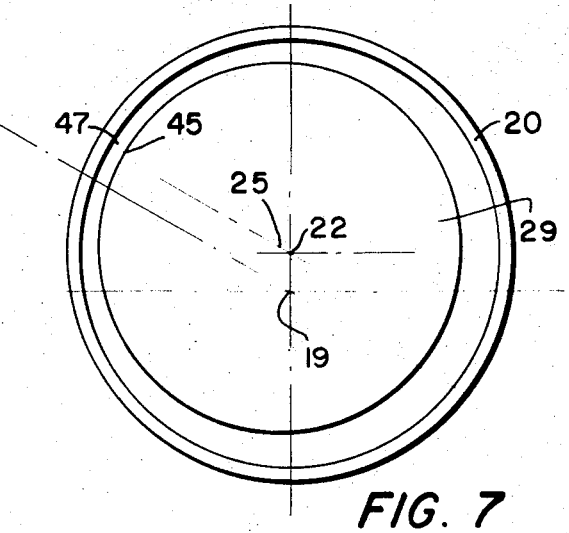
FIG. 7 is a schematic view similar to FIG. 6 showing the other wrist pin and bearing portions.
Figure 8:
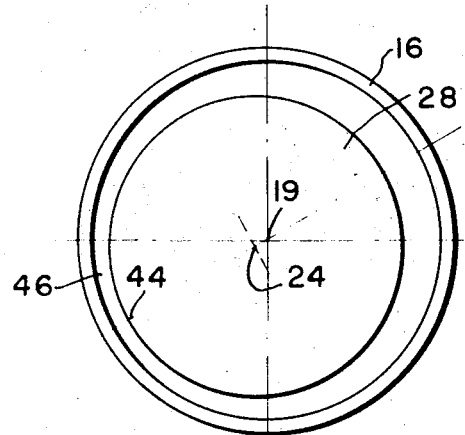
FIG. 8 is a schematic view of the wrist pin and bearing portions shown in FIG. 6 with the connecting rod swung below the centerline of the cross-head.
Figure 9:
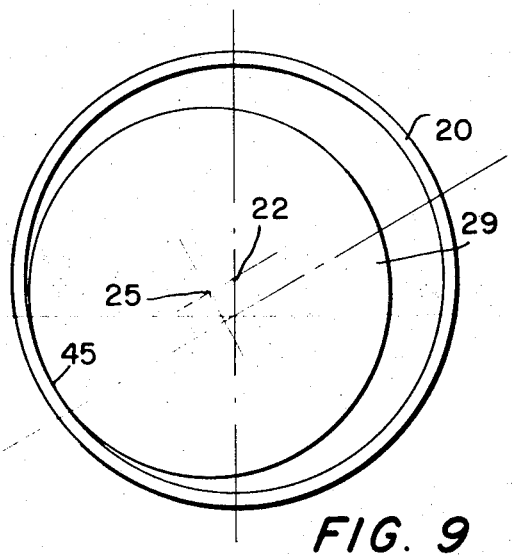
FIG. 9 is a view similar to FIG. 8 showing the wrist pin and bearing portions shown in FIG. 7.
Figure 10:
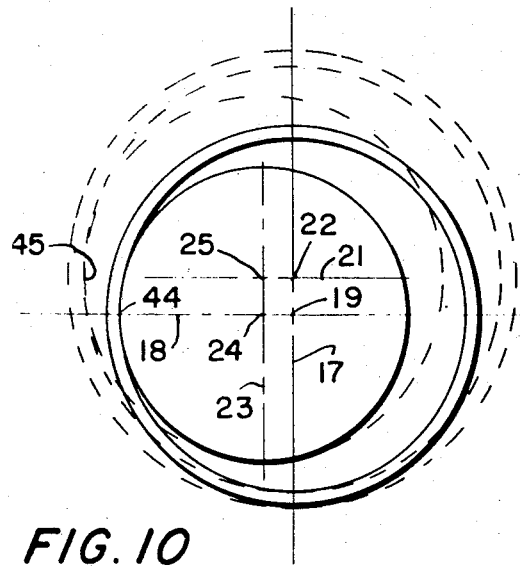
FIG. 10 is a schematic view of the coupling assembly with the connecting rod on the centerline of the cross-head and the load applied from the left.

Referring to FIGS. 4 through 10, when a load is applied from the frame end, the cross-head 11 tends to move relative to the wrist pin 26 causing contact between the pin means 26 and the bearings 16 and 20. Movement of the cross-head relative to the wrist pin causes the vertical centerline 17 of the bearings 16 and 20 to be moved to the right as shown in FIGS. 4, 5 and 10. This results in the vertical centerline 23 of the pin being displaced from the vertical centerline 17 of the bearings 16 and 20 by an amount equal to one half the no-load clearance between the wrist pin and bearings. The longitudinal axes of the pin portions 28 and 29 are displaced to the left of the axes of the bearings and are located on the vertical centerline 23 and horizontal centerlines 18 and 21 and designated 24 and 25, respectively.

Due to the eccentricity between the small pin portion 28 and the large pin portion 29, contact between the pin means and the bearings are at different points. The small pin 28 contacts the small bearing 16 at point 44 which is on horizontal centerline 18 as indicated in FIG. 10, while the large pin 29 contacts the large bearing 20 at point 45 which is on horizontal centerline 21. Since there is intimate contact between the pin and the bearing, lubricating fluid in the passages 39 cannot lubricate that portion. If lubricant is not transmitted to the portion where contact occurs, bearing failure will occur after a short period of time.

As the connecting rod oscillates above and below the centerline of oscillation, the wrist pin and hence the connecting rod is supported first on one set of bearings and then on the other set. A clearance exists between the wrist pin portions and bearings where there is no support. When constructed in accordance with the embodiment illustrated in the accompanying drawings, when the connecting rod swings above the centerline of oscillation, the wrist pin and connecting rod are supported on the first or small bearings 16. A clearance is provided between the second or large bearings 20 and the large diameter pin portion 29. When the connecting rod swings below the centerline of oscillation, the wrist pin and connecting rod are supported on the second or large bearings 20, and a clearance is provided between the first or small bearings 16 and the small diameter pin portion 28. This will become readily apparent when FIGS. 6 to 9 are considered.

As previously pointed out and as shown in FIG. 10, due to the eccentricity between the first and second bearings and between the first and second pin portions, when the connecting rod 10 is on the centerline of oscillation, the small pin portion 28 contacts the small bearing 16 at point 44 which is located on horizontal centerline 18. The large pin portion 29 contacts the large bearing 20 at point 45 which is located on horizontal centerline 21. Since the large pin portions 29 contact the large bearings 20 at a point 45 above the point 44 at which contact between the small pin portions 28 and the small bearings 16 occurs, when the connecting rod swings above the centerline of oscillation, the small pin portion 28 will remain in contact with the small bearing 16 at point 44. Some sliding action between the wrist pin and bearing will occur and the longitudinal axis 24 of the small pin portion 28 will move to the position shown in FIG. 6. The longitudinal axis 19 of the small bearing 16 will, of course, remain fixed. At the same time, the longitudinal axis 25 of the large pin portion 29 will move to the point shown in FIG. 7 since the relationship between the axis 24 and 25 remain fixed. The wrist pin and connecting rod are supported on the small bearing and a clearance 47 between the large pin and large bearing is created. Lubricating fluid then flows into this clearance to lubricate the large pin and bearing.

When the connecting rod swings below the centerline of oscillation, the large pin 29 will remain in contact with the lareg bearing 20 at point 45. Again, some sliding action will occur and the longitudinal axis 25 of the large pin portion 29 will move to the position shown in FIG. 9. The longitudinal axis 22 of the bearing 20 will, of course, remain fixed. At the same time, the longitudinal axis 24 of the small pin portion 28 will move to the point shown in FIG. 8 and a clearance 46 between the small pin 28 and the small bearing 16 will occur. The pin 26 and connecting rod 10 are now supported on the large bearing and lubricating fluid can flow into the clearance 46 to lubricate the small pin and bearing.

It can thus be readily seen that the wrist pin and connecting rod is continuously supported yet lubrication of the bearings is substantially continuous. Although the coupling has been shown with the small bearing supporting the wrist pin on the upward swing, it is important to remember that either bearing could be used for support at this point, depending on the eccentric arrangement used.

Figure 11:
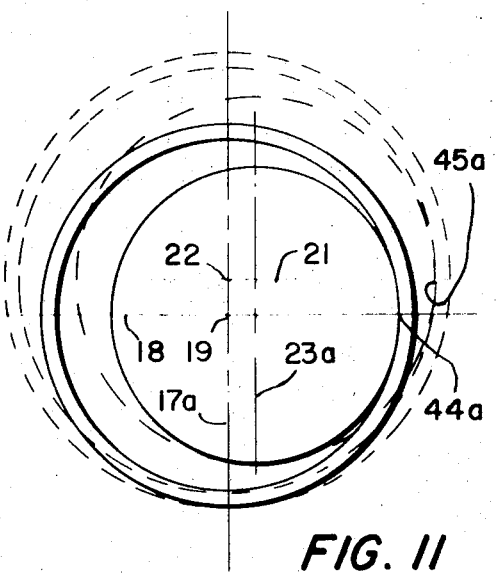
FIG. 11 is a view similar to FIG. 10 showing the load applied from the right.

The coupling assembly of this invention is particularly well adapted for high pressure compressors because it is operative regardless of the direction from which a non-reversing load is applied. If the load is a reversing load, no problems will be presented because clearance is automatically provided. If a non-reversing load is applied from the piston end, the bearings move to the left so that the vertical centerline of the bearings 16 and 20 is now located at 17a as shown in FIG. 11. In this instance, the contact points 44a and 45a are 180° from the point of contact when the load is applied from the frame end. Movement of the pin during connecting rod oscillation is the same as if loaded from the frame end.

It is apparent from the foregoing that the objects of this invention have been carried out by providing a connecting assembly which permits adequate lubrication yet will withstand non-reversing loads in either direction as well as reversing loads. It is intended that the foregoing description be merely that of a preferred embodiment and that this invention be limited solely by that which is within the scope of the appended claims.

I claim:

1. A coupling assembly for rotatably connecting first and second members comprising:
   a first member having a bore therein;
   a second member having a bore therein;
   one of said bores being disposed within the other of said bores;
   one of said bores having first and second bearing surfaces;
   said first bearing surface being eccentric to said second bearing surface and having a radius of curvature different from said second bearing surface; and
   pin means extending into each of said bores and having first and second arcuate surface portions;
   said first arcuate surface portion being eccentric to said second arcuate surface portion and having a radius of curvature different from said second arcuate surface portion.

2. The coupling assembly of claim 1 wherein the first and second arcuate portions on said pin means extends into the bore having first and second bearing surfaces.

3. The coupling assembly of claim 2 wherein the first arcuate surface portion on said pin means is formed so that its axis of curvature is concentric with the axis of curvature of said first bearing surface and has a radius of curvature smaller than the radius of curvature of said first bearing surface.

4. The coupling assembly of claim 3 wherein the second arcuate surface portion on said pin means is formed so that its axis of curvature is concentric to the axis of curvature of said second bearing surface and has a radius of curvature smaller than the radius of curvature of said second bearing surface.

5. The coupling assembly of claim 2 wherein said pin means includes a portion extending into the other bore having its axis of curvature coaxial with the axis of curvature of said other bore.

6. The coupling assembly of claim 2 wherein the radius of curvature of said first bearing surface is smaller than the radius of curvature of said second bearing surface and the radius of curvature of said first arcuate surface portion of said pin means is smaller than the radius of curvature of said second arcuate surface portion.

7. An assembly for coupling two members, one of which oscillates relative to the other and one of which has a load applied thereto comprising:
   a first member having a bore therein having first and second bearing surfaces;
   said first bearing surface being eccentric to and having a radius of curvature smaller than said second bearing surface;
   a second member having a wrist pin connected thereto;
   said wrist pin having a first portion which is eccentric to and has a radius of curvature smaller than a second portion of said wrist pin;
   said wrist pin being dimensioned to fit within the bore of said first member so that when the oscillating member is on the centerline of oscillatory movement, the first pin portion contacts the first bearing surface and the second pin portion contacts the second bearing surface and when the oscillating member swings to one side of centerline, clearance is provided between said first pin portion and said first bearing surface and when said oscillating member swings to the other side of said centerline, clearance is provided between said second pin portion and said second bearing surface; and
   means for feeding lubricant between the bearing surfaces and the wrist pin.

8. The assembly of claim 7 wherein said lubricant feeding means comprises a longitudinal passage in said wrist pin and at least one radial passage in said wrist pin extending from said longitudinal passage to the outer periphery of said wrist pin and one of said members includes passage means for conducting lubricant to said longitudinal passage.

9. The assembly of claim 8 wherein said lubricant feeding means further comprises passage means in each of said bearing surfaces and a radial passage communicates with each of said passage means.

10. The assembly of claim 7 wherein said first portion of said wrist pin has a radius of curvature smaller than the radius of curvature of said first bearing surface and said second portion of said wrist pin has a radius of curvature smaller than the radius of curvature of said second bearing surface and the first portion of said wrist pin is concentric with said first bearing surface and said second portion of said wrist pin is concentric with said second bearing surface when the assembly is in an unloaded condition.

11. A coupling assembly for rotatably connecting first and second members comprising:
    a first member having a bore therein;
    a second member having a bore therein;
    one of said bores being disposed within the other of said bores;
    one of said bores having first and second bearing surfaces;
    said first bearing surface being eccentric to said second bearing surface; and
    pin means extending into each of said bores and having first and second arcuate surface portions;
    said first arcuate surface portion being eccentric to said second arcuate surface portion;
    said first arcuate surface portion having a radius of curvature smaller than said first bearing surface and said second arcuate surface portion having a radius of curvature smaller then said second bearing surface.

References Cited

UNITED STATES PATENTS

| | | | |
|---|---|---|---|
| 2,890,893 | 6/1959 | Laukhuff | 287—100 X |
| 3,011,812 | 12/1961 | Warming | 287—100 |
| 3,124,370 | 3/1964 | Traugott | 287—100 |
| 3,132,906 | 5/1964 | Sternlicht | 308—36.3 |
| 2,483,443 | 10/1949 | Spence | 308—62 |
| 2,757,990 | 8/1956 | Barlow | 308—78 |
| 3,053,595 | 9/1962 | Dilworth | 308—78 |
| 3,342,507 | 9/1967 | Koch | 308—62 |

WESLEY S. RATLIFF, Jr., Primary Examiner